United States Patent [19]

Wu et al.

[11] Patent Number: 5,707,918

[45] Date of Patent: Jan. 13, 1998

[54] HYDROCARBON ISOMERIZATION CATALYST BLEND

[75] Inventors: An-hsiang Wu, Bartlesville; Charles A. Drake, Nowata; Ralph J. Melton, Bartlesville, all of Okla.

[73] Assignee: Phillips Petroleum Company, Bartlesville, Okla.

[21] Appl. No.: 521,146

[22] Filed: Aug. 29, 1995

[51] Int. Cl.$^6$ .............. B01J 27/13; B01J 23/00; B01J 23/42

[52] U.S. Cl. .......... 502/230; 502/229; 502/313; 502/315; 502/326; 502/334

[58] Field of Search .............. 502/229, 230, 502/313, 314, 315, 326, 333, 334, 335, 107

[56] References Cited

U.S. PATENT DOCUMENTS

| | | | |
|---|---|---|---|
| 2,623,861 | 12/1952 | Haensel | 502/230 |
| 2,733,219 | 1/1956 | Bloch | 252/442 |
| 2,802,794 | 8/1957 | Sprauer | 502/333 |
| 2,900,425 | 8/1959 | Bloch et al. | 260/666 |
| 2,999,074 | 9/1961 | Bloch et al. | 502/230 |
| 3,113,931 | 12/1963 | Voltz | 502/107 |
| 3,147,229 | 9/1964 | Hinlicky et al. | 502/229 |
| 3,231,517 | 1/1966 | Bloch et al. | 252/442 |
| 3,248,343 | 4/1966 | Kelly et al. | 252/442 |
| 3,285,990 | 11/1966 | Kelly et al. | 260/683.7 |
| 3,755,140 | 8/1973 | Pollitzer | 208/62 |
| 3,787,313 | 1/1974 | Pollitzer | 208/60 |
| 3,905,915 | 9/1975 | Wristers | 502/107 |
| 3,963,643 | 6/1976 | Germanas et al. | 252/442 |
| 4,008,176 | 2/1977 | Rust et al. | 502/107 |
| 4,045,509 | 8/1977 | Benson, Jr. | 260/683.75 |
| 4,079,175 | 3/1978 | Tokunaga et al. | 502/128 |
| 4,113,789 | 9/1978 | Rao et al. | 260/683.68 |
| 4,201,696 | 5/1980 | Legendre et al. | 252/442 |
| 5,004,859 | 4/1991 | Schmidt et al. | 585/741 |
| 5,474,964 | 12/1995 | Wu et al. | 502/326 |
| 5,536,692 | 7/1996 | Kubicek et al. | 502/230 |
| 5,543,374 | 8/1996 | Wu | 502/107 |

*Primary Examiner*—Glenn Caldarola
*Assistant Examiner*—Patricia L. Hailey
*Attorney, Agent, or Firm*—Charles W. Stewart

[57] ABSTRACT

A Group VIII metal- and chloride-containing composition is prepared by a method which comprises mixing (A) a solid material containing at least one Group VIII metal (Pt and/or Pd and/or Ni) and alumina as the support and (B) an alumina-supported aluminum- and chlorine-containing compound which has been prepared by mixing an alumina material with AlCl$_3$ and/or at least one organoaluminum chloride (such as ethylaluminum dichloride), heating the mixture at a temperature of about 600°–750° C. and then with an HCl-containing gas at a temperature of about 100°–750° C. The thus-obtained composition comprising components (A) and (B) is employed as a catalyst in the isomerization of C$_4$–C$_8$ alkanes and/or cycloalkanes (e.g., n-butane).

28 Claims, No Drawings ns
5,707,918

HYDROCARBON ISOMERIZATION CATALYST BLEND

BACKGROUND OF THE INVENTION

In one aspect, this invention relates to an isomerization catalyst compositions which comprise a Group VIII metal-containing component and a chlorinated alumina component. In another aspect, this invention relates to processes for isomerizing saturated $C_4$–$C_8$ hydrocarbons (alkanes and/or cycloalkanes) employing the novel catalyst compositions of this invention.

Supported Group VIII metal- and chloride-containing catalyst compositions for alkane isomerization reactions are well known, and are described in the patent literature, e.g., in U.S. Pat. Nos. 4,004,859 and 4,149,993. However, there are ever present incentives for the development of new, more effective and/or more practical catalyst compositions and methods of preparing them.

SUMMARY OF THE INVENTION

It is an object of this invention to provide novel supported, Group VIII metal- and chloride-containing compositions, which are effective as catalysts for isomerizing alkanes and/or cycloalkanes. It is another object of this invention to provide a method of preparing these novel compositions. It is a further object of this invention to employ these novel compositions as catalysts in the isomerization of alkanes and/or cycloalkanes. It is a specific object of this invention to provide a catalyst composition which comprises platinum, chloride and alumina. It is another specific object of this invention to provide a catalyst composition which comprises palladium, chloride and alumina. It is still another specific object of this invention to prepare a catalyst composition comprising nickel, chloride and alumina. Other objects and advantages will become apparent from the detailed description and the appended claims.

In accordance with this invention, a method of preparing a solid Group VIII metal- and chlorine-containing composition is prepared by a method which comprises blending (mixing):

(A) a first solid material comprising (i) at least one Group VIII metal selected from the group consisting of platinum, palladium and nickel and (ii) alumina as the support, wherein halogens are substantial absent from said first solid material; and (B) a second solid material comprising at least one aluminum- and chlorine-containing compound and alumina as the support, wherein Group VIII metals are substantially absent from said second solid material and wherein said second solid material has been prepared by a method comprising (a) mixing an alumina material with at least one aluminum- and chlorine-containing compound selected from the group consisting of aluminum chloride and organoaluminum chlorides;

(b) heating the material obtained in step (a) in a substantially inert gas atmosphere at a temperature of about 600°–750° C. for a time period of at least about 10 minutes; and (c) treating the material obtained in step (b) with a hydrogen chloride-containing gas at a temperature of about 100°–750° C. for a time period of at least about 10 minutes.

In a preferred embodiment, the first solid material (A) comprising components (i) and (ii) has been prepared by a method comprising:

(1) impregnating an alumina material with at least one compound of at least one Group VIII metal selected from the group consisting of platinum, palladium and nickel;

(2) calcining the impregnated alumina material obtained in step (1) at a temperature of about 300°–650° C. for a time period of at least about 10 minutes; and (3) treating the calcined material obtained in step (2) with a reducing gas (preferably a free hydrogen-containing gas) at a temperature of about 200°–550° C. for a time period of at least about 10 minutes.

DETAILED DESCRIPTION OF THE INVENTION

Any suitable alumina material can be used in step (1) and in step (2) of the preparation method of this invention. Suitable aluminas include (but are not limited to) hydrated aluminas (such as boehmite, pseudoboehmite, bayerite), alpha-alumina, beta-alumina, gamma-alumina, delta-alumina, eta-alumina and theta-alumina, preferably gamma-alumina. The alumina material generally has a surface area (determined by the BET method of Brunauer, Emmett and Teller employing $N_2$) of about 100–400 m²/g, a pore volume (measured by nitrogen intrusion porosimetry) of about 0.2–1.0 cm³/g, and a particle size of about 8–200 mesh. The alumina particles can be spherical, cylindrical, trilobal, or can have any other suitable shape. The presently preferred alumina particles are cylindrical extrudates. The alumina material can consist essentially of alumina. However, it is within the scope of this invention to have small amounts of Ti or Zr or both metals (generally as $TiO_2$ and $ZrO_2$, respectively; a level of about 0.05–1.0 weight-% Ti or Zr or Ti+Zr) used in step (1) or in step (a), or in both steps.

Any suitable platinum compound (preferably one which is water-soluble) can be used as the at least one Group VIII metal compound in step (1) of the preparation method for making the first solid material (A). Suitable Pt compounds are well known and include (but are not limited to) platinum (II)chloride, platinum(IV)chloride, hexachloroplatinic(IV) acid, ammonium hexachloroplatinate(IV), tetrammineplatinum(II) chloride, tetrammineplatinum(II) carbonate, tetrammineplatinum(II) hydroxide, dichlorodiammineplatinum(II), tetrachlorodiammineplatinum(IV), platinum(II) nitrate, platinum(IV) nitrate, hexammineplatinum(II) nitrate, hexammineplatinum(IV) nitrate, diammineplatinum(IV) nitrite, diammineplatinum(II) oxalate, and many other complex (coordination) compounds of divalent and tetravalent platinum. Presently preferred is hexachloroplatinic acid, $H_2PtCl_6$.

Any suitable palladium compound (preferably water-soluble) can be used as the at least one Group VIII metal compound in step (1) of the preparation method of this invention. Suitable Pd compounds include (but are not limited to) palladium(II) chloride, palladium(II) nitrate, palladium(II) sulfate, palladium(IV) chloride, hexachloropalladic(IV) acid ($H_2PdCl_6$), ammonium hexachloropalladate(IV), tetramminepalladium(II) nitrate, tetramminepalladium(II) chloride, tetramminepalladium (IV) nitrate, tetramminepalladium(IV) chloride, and other coordination compounds of divalent and tetravalent palladium.

Any suitable nickel compound (preferably water-soluble) can be used as the at least one Group VIII metal compound in step (1) of the preparation method of this invention. Suitable Ni compound include (but are not limited to) nickel(II) chloride, nickel(II) nitrate, nickel(II) sulfate, ammonium nickel(II) sulfate, nickel(II) acetate, nickel(II) oxalate, hexamminenickel(II) chloride, hexamminenickel (II) nitrate, hexamminenickel(II) sulfate, and other coordination compounds of divalent nickel. Presently preferred is nickel(II) nitrate, more preferably $Ni(NO_3)_2 \cdot 6H_2O$.

It is within the scope of this invention to have a dissolved titanium compound also present in step (1) of the preparation method of this invention, in particular when the alumina contains no Ti. Any soluble (preferably water soluble) titanium compound can be used in step (1), either before or simultaneously with or after the impregnation of alumina with at least one compound of at least one Group VIII metal (more preferably platinum). Suitable Ti compounds which can be employed in this embodiment include (but are not limited to) titanium halides such as $TiCl_4$, tetraalkyl titanates of the general formula $T(OR)_4$ wherein each R is an alkyl group (such as tetraethyl titanate, tetra-n-propyl titanate, tetraisopropyl titanate, tetrabutyl titanates) and water-soluble alkanolamine titanates (such as those described in U.S. Pat. Nos. 2,824,114; 2,935,522; 2,950,174; 3,028,297; 3,694,475; 3,892,791 and 4,621,148). These latter compounds are generally prepared by reacting one mole of tetralkyl titanate with 1–4 (preferably 2) moles of an alkanolamine selected from the group consisting of ethanolamine, diethanolamine, triethanolamine (preferred), monoisopropylamine, diisopropylamine and triisopropylamine. Each of the alkyl (R) groups (which may be the same as or different from one another) of the tetralkyl titanate, $(Ti(OR)_4)$, generally contains 2–4 carbon atoms, and preferably is the isopropyl group. A particular alkanolamine titanate which can be used in step (1) of the method of this invention is prepared by the reaction of 1 mole of tetraisopropyl titanate, $Ti(OC_3H_7)_4$, with 2 moles of triethanolamine, also referred to as tri(2-hydroxyethyl) amine, thus forming primarily diisopropyl-bis (triethanolamine) titanate. A solution containing 80 weight-% of diisopropyl-bis(triethanolamine) titanate and 20 weight-% of isopropanol is commercially available from DuPont de Nemours and Co., Wilmington, Del., under the product designation of "TYZOR" TE TITANATE (wherein "TYZOR" is a registered trademark of Du Pont).

The alumina material (described above) can be impregnated in step (1) with at least one dissolved Group VIII metal compound in any suitable manner, such as by incipient wetness impregnation or by spraying with an impregnating solution containing at least one dissolved Group VIII metal compound. Generally, the total concentration of the at least one Group VIII metal compound (i.e., at least one Pt compound or at least one Pd compound or at least one Ni compound or mixtures of compounds of different Group VIII metals) in the impregnating solution is in the range of about 0.01–2 mol/l. Generally, the solvent of the impregnating solution is an alcohol (such as ethanol) and/or water (the latter being presently preferred). For some Group VIII metal compounds (such as $H_2PtCl_6$) it is preferred to employ slightly acidified water (e.g., solution of HCl in water having a pH of about 1–3) as the solvent. If it is desired to also impregnate the alumina with at least one Ti compound (in particular, when the at least one Group VIII metal compound is at least one Pt compound), this can be done before or concurrently with or after the impregnation with the at least one Group VIII metal compound. The concentration of the Ti compound in the impregnating solution generally is about 0.01–2.0 mol/l. The solvent of this impregnating solution can be water and/or an alcohol (such as ethanol) or any other suitable liquid in which the particular Ti compound is soluble and stable. The weight ratio of the Group VIII metal-containing impregnating solution to alumina in step (1) is such as to attain a weight percentage of about 0.1–5 (preferably about 0.2–2) weight-% Group VIII metal (on an elemental basis) in the finished composition (i.e., the material obtained in the last step of the preparation method of this invention). If impregnation with at least one Ti compound is also carded out, the weight ratio of the Ti-containing impregnating solution to the alumina material generally is such as to attain a weight percentage of about 0.05–1.0 (preferably about 0.1–0.3) weight-% Ti (on an elemental basis) in the finished composition.

In step (2), the Group VIII metal-impregnated alumina material obtained in step (1) is heated (calcined) at a temperature of about 300°–650° C. (preferably 450°–550° C.) for a time period of about 0.5–20 hours (preferably about 2–4 hours). This calcining step can be done in an inert atmosphere (i.e., $N_2$, He, Ne, Ar) or in an $O_2$-containing atmosphere (e.g., air). Preferably, a drying step (generally at about 80°–150° C.) precedes heating step (2).

In step (3), the calcined material obtained in step (2) is treated with a reducing gas (preferably a gas stream) which generally comprises (preferably consists essentially of) free hydrogen ($H_2$), generally at a temperature of about 200°–550° C. (preferably about 350°–450° C.) for a time period of about 0.5–20 hours. Other (less preferred) reducing gases include (but are not limited to) carbon monoxide, $C_1$–$C_6$ alkanes and $C_2$–$C_6$ alkenes and $C_4$–$C_6$ alkadienes.

In step (a) of the preparation method for making the second solid material (B), the alumina starting material (described above), from which chemically bound halogen (fluorides, chlorides, bromides, iodides) are substantially absent (i.e., the halide content is less than about 0.1 weight-percent), is contacted with at least one suitable aluminum- and chloride-containing compound. Examples of effective Al—Cl-containing compounds include (but are not limited to) aluminum chloride ($AlCl_3$) and alkylaluminum chlorides such as methylaluminum dichloride, methylaluminum sesquichloride, dimethylaluminum chloride, ethylaluminum dichloride, ethylaluminum sesquichloride, diethylaluminum chloride, propylaluminum dichloride, dipropylaluminum chloride, butylaluminum dichloride, dibutylaluminum chloride, and mixtures thereof. Presently preferred are aluminum chloride, ethylaluminum dichloride and dibutylalumminum chloride. These compounds are easily hydrolyzed and, therefore, should be handled and applied to alumina in a dry, inert gas environment. It is within the scope of this invention to have at least one titanium compound present in step (a). Suitable titanium compounds include (but are not limited to) those listed for step (1). The amount of the Ti compound(s) which can be used in step (a) is such as to obtain a material in step (c) which contains about 0.05–1.0 weight-% Ti.

Generally, the weight ratio of the to aluminum- and chlorine-containing compound to the alumina material in step (a) is in the range of about 0.05:1 to about 1:1, preferably about 0.1:1 to about 0.3:1. If an organoaluminum chloride is used, it is generally dissolved in an essentially water-free solvent and alumina is then impregnated with the obtained solution (which generally contains about 5–50 weight-% of the organoaluminum chloride) at a temperature of about 10°–50° C. for a time period of about 0.5–5 hours (preferably about 1–2 hours). The solvent in which the organoaluminum compound is dissolved generally is a dry organic hydrocarbon solvent, such as $C_6$–$C_{10}$ cycloalkane, benzene, toluene, xylenes or mixtures thereof. The presently preferred solvent is cyclohexane. It is within the scope of this invention (yet less preferred) to vaporize the organoaluminum chloride and contact the thus-vaporized compound with the alumina at the above-recited weight ratio.

In step (b), the Al—Cl treated material obtained in step (a) is heated at a temperature of about 600°–750° C. (preferably about 620°–700° C.), generally for a period of time of about 0.5–20 hours (preferably about 0.5–2 hours). This heating step is carried out in an inert gas atmosphere (e.g., $N_2$, He, Ne, Ar). Preferably, step (b) is carried out in an upflow mode. It is presently preferred to carry out preliminary heating steps (more preferably in upflow inert gas streams) before step (b): increasing the temperature of the material obtained in step (a) from room temperature (about 10°–40° C.) to about 200°–275° C. within about 0.5–5 hours, heating at about 200°–275° C. for about 1–20 hours, and then increasing the temperature from about 200°–225° C. to about 600°–750° C. (more preferably about 620°–700° C.) within a time period of about 0.5–3 hours.

Chlorination step (c) is carried out by heating of the material obtained in step (b) with an HCl-containing gas. The HCl treatment step is carried out at a temperature of about 100°–750 ° C. (more preferably about 250°–700° C.; most preferably about 350–650) for a period of time of about 0.2–20 hours (preferably about 0.5–3 hours). Pure HCl gas can be used, but generally HCl is diluted with an inert gas (e.g., $N_2$, He, Ne, Ar) or with $H_2$, preferably such that the HCl-containing gas mixture contains about 10–30 weight-% HCl. The HCl-treated material generally is cooled to room temperature (about 10°–40° C.), preferably in an inert gas atmosphere. Preferably, step (c) is carried out in an upflow mode, which generally results in a more uniform finished catalyst.

The finished catalyst composition is obtained by physically blending (by any suitable mixing means preferably a mechanical blender) first solid material (A) and second solid material (B), preferably in a dry, inert gas atmosphere. The weight ratio of first solid material (A) to second solid material (b) in the finished composition is about 1:40 to about 10:1, preferably about 1:20 to about 4:1. The finished catalyst composition generally contains about 0.01–50 weight-% of Group VIII metal (Pt and/or Pd and/or Ni) about 1–8 (preferably about 3–7) weight-% Cl (chemically bound as chloride), and, optionally, about 0.05–1.0 weight-% Ti. If the Group VIII metal is Ni, the preferred weight-percentage in the catalyst composition is about 1–45 weight-% Ni, more preferably about 2–40 weight-% Ni. In the case of Pt and/or Pd, the preferred weight percentage is about 0.1–10 weight-% Pt or Pd or (Pt+Pd), more preferably about 0.2–5 weight-% Pt or Pd or (Pt+Pd). The surface area, pore volume, shape and particle size of the finished catalyst composition are approximately the same as those of the alumina starting material (recited above).

The catalyst prepared by the method of this invention can be employed in the isomerization of at least one saturated feed hydrocarbon (selected from the group of alkanes and/or cycloalkanes, preferably normal alkanes) containing 4–8 carbon atoms per molecule to at least one $C_4$–$C_8$ product isomer, in accordance with this invention. Examples of suitable feed hydrocarbons include (but are not limited to) normal butane, normal pentane, normal hexane, normal heptane, normal octane, cyclohexane, methylcyclopentane, cycloheptane and methylcycloheptane (more preferably n-butane), generally in the presence of hydrogen. These so-called hydroisomerization processes are well known and have been described in the patent literature (e.g., in U.S. Pat. Nos. 4,149,993 and 5,004,859). Generally, hydrogen is mixed with the saturated feed hydrocarbon to form a feed mixture which is contacted with the isomerization catalyst of this invention contained in an isomerization zone. The concentration of the hydrogen in the feed mixture during this contacting step shall be such as to provide a hydrogen:hydrocarbon molar ratio of at least about 0.01:1, generally about 0.01:1 to about 5:1, preferably about 0.02:1 to about 2:1. The basic isomerization reaction conditions are well known and can be varied to achieve the desired conversion of the feed hydrocarbon to the desired isomer in a manner known in the art. Also, the recovery of the product isomer from the reaction mixture can be carried out by any suitable separation technique, such as fractional distillation. Isomerization of normal butane (n-butane) to isobutane is the presently preferred reaction carried out with the catalyst composition of this invention.

Generally, the saturated feed hydrocarbon and $H_2$ gas are contacted with the catalyst (generally present in a fixed bed) at a reaction temperature of at least about 200° F., preferably at a temperature of about 200°–500° F. In the preferred case of n-butane isomerization, the temperature is generally about 250°–400° F. Generally, the liquid hourly space velocity of the saturated hydrocarbon feed stream, i.e., cc of liquid feed hydrocarbon per cc of catalyst per hour, is about 0.1 to about 15. Generally, the reaction pressure is within the range of 200 psig to about 1500 psig in the isomerization zone. The gas hourly space velocity of the hydrogen feed stream is generally about 10–2,000 (preferably about 50–950) cc $H_2$ per cc catalyst per hour (so as to give the above-recited $H_2$:hydrocarbon ratio). In order to activate the catalyst and to retard its deactivation during the isomerization reaction, about 0.001 to about 1 weight percent chloride is frequently added to the alkane feed, generally in the form of at least one chloroalkane (described above), preferably carbon tetrachloride, chloroform, ethyl chloride or isopropyl chloride.

When the catalyst, after it has been in use in the hydroisomerization process, has lost its activity to the extent that the desired alkane conversion can no longer be attained at the desired reaction temperature, the catalyst can be reactivated by mining off the flow of the saturated feed hydrocarbon while maintaining the flow of the $H_2$ stream through the isomerization catalyst, generally at about the same gas hourly space velocity of $H_2$ as in the isomerization reaction. The temperature in this reactivation step is generally about the same as in the isomerization reaction, but may be readjusted upward or downward to maximize the reactivation effect. In the preferred reactivation mode, a reducing gas stream consisting essentially of hydrogen is passed through the partially deactivated isomerization catalyst bed at a temperature of about 80°–350° F. (preferably about 250°–330° F.) and a GHSV (gas hourly space velocity) of about 10–2,000 cc $H_2$ per cc catalyst per hour (more preferably about 50–950 cc/cc/hour), for a time period of about 2 hours to about 10 days (more preferably about 5 hours to about 7 days). Thereafter, the reactivated catalyst is redeployed in the alkane hydroisomerization of saturated $C_4$–$C_8$ hydrocarbons, as described above.

The following examples are provided to further illustrate this invention and are not to be considered as unduly limiting the scope of this invention.

EXAMPLE I

This example illustrates the preparation of blends of (a) Pt- or Pd- or Ni-impregnated alumina and (b) alumina which had been treated with either $AlCl_3$ or an alkylaluminum chloride.

Catalyst A1 was a commercial platinum-on-alumina catalyst (provided by the Catalyst Group of Mallinckrodt Chemical, Inc., Erie, Pa., under the product designation "Calsicat E-281"; Pt content: 0.3 weight-%; particle size: 20–40 mesh; bulk density: about 0.73 g/cc) which had been heated for 2 hours in a hydrogen gas stream at 400° C.

Catalyst A2 was a commercial palladium on alumina catalyst (provided by United Catalysts, Inc., Louisville, Ky. under the product designation "L-3436"; Pd content: 0.5 weight-%; particle size: 20–40 mesh; bulk density: about 0.71 g/cc) which had been heated for 2 hours in a hydrogen gas stream at 400° C.

Catalyst A3 was a commercial nickel on alumina catalyst (provided by Engelhard Corporation, Iselin, N.J., under the product designation "Hatshaw Ni-3285"; Ni content: 55 weight-%; particle size: 20–40 mesh; bulk density: about 0.75 g/cc) which had been heated for 2 hours in a hydrogen gas stream at 400° C.

Catalyst B1 was prepared as follows. 14.75 g gamma-alumina (provided by Criterion Catalyst Company, Houston, Tex.; bulk density: about 0.71 g/cc), which had been dried for 2 hours in air at 250° C., was soaked for 16 hours at room temperature under an argon atmosphere with 8.0 g of a 50 weight-% solution of ethylaluminum dichloride (EADC) in cyclohexane. The thus-impregnated material was heated in a helium stream (flow rate: 40 cc/minute) to a temperature of 650° C. at a rate of about 10° C./minute, and heated at that temperature for 2 hours. Thereafter, the material was treated for 2 hours with an HCl/He gas mixture (flow rate of HCl: 300 cc/minute; flow rate of He: 40 cc/minute) at 650° C. The HCl-treated material was cooled from a temperature of 650° C. to a temperature of 150° C. in a HCl/He gas stream (flow rate of HCl: 300 cc/minute; flow rate of He: 300 cc/minute) and then to a temperature of about 100° C. in a He gas stream (flow rate: 300 cc/minute).

Catalyst B2 was prepared essentially in accordance with the procedure for Catalyst B1 except that the EADC/cyclohexane solution contained 30 weight-% EADC.

Catalyst B3 was prepared essentially in accordance with the procedure for Catalyst B1 except that a 30 weight-% solution of diethylaluminum chloride (DEAC) in cyclohexane was used (in lieu of the EADC solution).

Catalyst B4 was prepared essentially in accordance with the procedure per Catalyst B1 except that a 30 weight-% solution of dibutylaluminum chloride (DBAC) in cyclohexane was used (in lieu of the EADC solution).

Catalyst B5 was prepared by mixing 14.75 g "Criterion" alumina with 2.00 g dry AlCl₃ under a dry helium atmosphere at room temperature, heating the obtained AlCl₃/Al₂O₃ mixture in a He gas stream (flow rate: 40 cc/minute) at 650° C., followed by cooling the mixture in the He stream to 400° C., heating the mixture in a He/HCl gas stream (flow rate of He: 300 cc/minute, flow rate of HCl: 300 cc/minute) at a temperature ranging from 400° C. to 150° C., and cooling the HCl-treated material in a He stream to 100° C.

EXAMPLE II

This example illustrates the performance of blends (physical mixtures) of the various "A" and "B" catalysts described in Example I in the isomerization of n-butane.

20 cc of a particular catalyst blend was placed in a stainless steel reactor tube having an inner diameter of 1 inch and a length of 28 inches. The steel reactor tube was heated to about 138° C. A stream of hydrogen gas was passed through the catalyst bed at a rate of 1.34 cubic feet per hour. The reactor pressure was about 500 psig. Liquid n-butane was introduced at a rate of 78.2 cc/hour (liquid hourly space velocity: 3.9 cc/cc catalyst/hour), while the flow of the hydrogen gas stream was maintained at 1.34 ft³/hour so as to provide a molar ratio of $H_2$ to n-butane of about 50:1. After the hydrogen/n-butane mixture had passed through the catalyst bed at the above conditions for about 10 minutes, carbon tetrachloride was injected into this feed mixture at a rate of 16 micro liters per hour for a time period of up to 22–24 hours. Thereafter, the $CCl_4$ feed rate was reduced to 6 micro liters per hour, and the test was continued. The isomerization product was analyzed by means of a gas chromatograph. Pertinent catalyst preparation parameters and isomerization test results (obtained at comparable reaction times) are summarized in Table I.

TABLE I

| Run | Catalyst Components "A" and "B" | Weight Ratio of "A" Catalyst Component to "B" Catalyst Component | n-Butane Isomerization Reaction Time (Hr) | % Isobutane in Product* |
|---|---|---|---|---|
| 1 (Invention) | A1 + B1 | ~1:1 | 24 | 12.6 |
| 2 (Invention) | A2 + B1 | ~1:1 | 24 | 12.0 |
| 3 (Invention) | A3 + B1 | ~1:1 | 24 | 12.5 |
| 4 (Invention) | A3 + B1 | ~2:1 | 24 | 12.1 |
| 5 (Invention) | A3 + B1 | ~4:1 | 24 | 10.0 |
| 6 (Invention) | A3 + B1 | ~10:1 | 24 | 6.8 |
| 7 (Invention) | A3 + B1 | ~1:10 | 24 | 12.3 |
| 8 (Invention) | A3 + B1 | ~1:20 | 24 | 12.3 |
| 9 Invention | A3 + B1 | ~1:40 | 24 | 6.8 |
| 10 Invention | A3 + B2 | ~1:1 | 24 | 12.2 |
| 11 (Invention) | A3 + B3 | ~1:1 | 24 | 12.4 |
| 12 (Invention) | A3 + B4 | ~1:1 | 24 | 12.5 |
| 13 (Invention) | A3 + B5 | ~1:1 | 24 | 11.9 |
| 14 (Control) | A3 | — | 24 | 0.3 |
| 15 (Control) | B3 | — | 24 | 0.6 |

*weight ratio of isobutane to all butanes (i.e., isobutane + unconverted n-butane)

Test data in Table I show that blends of "A" and "B" catalyst components were quite active as n-butane isomerization catalysts, whereas an "A" catalyst alone (Catalyst A3) and a "B" catalyst alone (Catalyst B 1) exhibited essentially no n-butane isomerization activity. Effective weight ratios of catalyst component "A" to catalyst component "B" ranged from about 1:40 to about 10:1, with a weight ratio in the range of about 1:20 to about 4:1 being preferred.

EXAMPLE III

This example compares the performance in alkane isomerization tests of a catalyst blend prepared according to the present invention with a catalyst blend suggested by U.S. Pat. No. 2,900,425.

Catalyst B6 was prepared substantially in accordance with the procedure described in Example II of U.S. Pat. No. 2,900,425, except that the alumina contained no platinum. A mixture of 15.0 g of "Criterion" alumina (described above) and 2.15 g dry AlCl₃ was heated for 2 hours at 250° C. in an autoclave under a hydrogen gas pressure of 25 psig with agitation. The mixture was then cooled to room temperature under hydrogen gas.

Catalyst B7 was prepared by heating 17.25 g of cooled Catalyst B6 in a He gas stream (flow rate: 40 cc/minute) to 650° C. at a rate of 10° C./minute and heating the material for 2 hours at that temperature in the He gas stream, followed by lowering the temperature to 400° C. and heating for about 120 minutes in a He/HCl gas mixture (flow rate of He: 300 cc/minute; flow rate of HCl: 300 cc/minute) at a temperature ranging from 400° C. to 150° C. The thus-treated material was allowed to cool in a He gas stream. 20 cc of Catalyst A3 (described in Example I) was blended with 20 cc of Catalyst B6 and Catalyst B7, respectively. The two blends were tested for n-butane activity in accordance with the procedure described in Example II.

The result is summarized in Table II below.

TABLE II

| Run | Catalyst Blend | n-Butane Isomerization | |
|---|---|---|---|
| | | Reaction Time (Hr) | % Isobutane in Product |
| 16 (Control) | A3 + B6 | 24 | 0.2 |
| 17 (Invention) | A3 + B7 | 24 | 12.0 |

The above-described test results clearly show the activity advantage of the catalyst blend prepared in accordance to the procedure of this invention over a corresponding blend suggested by U.S. Pat. No. 2,900,423.

Reasonable variations, modifications and adaptations for various conditions and reactants can be made within the scope of the disclosure and the appended claims without departing from the scope of this invention.

That which is claimed:

1. A method of preparing a solid Group VIII metal- and chlorine-containing composition which comprises blending:
   (A) a first solid material comprising (i) at least one Group VIII metal selected from the group consisting of platinum, palladium and nickel and (ii) alumina as the support, wherein halogens are substantially absent from said first solid material; and
   (B) a second solid material comprising at least one aluminum- and chlorine-containing compound and alumina as the support, wherein Group VIII metals are substantially absent from said second solid material and wherein said second solid material has been prepared by a method comprising
      (a) mixing a first alumina material with at least one aluminum- and chlorine-containing compound selected from the group consisting of aluminum chloride and organoaluminum chlorides;
      (c) heating the material obtained in step (a) in a substantially inert gas atmosphere at a temperature of about 600°–750° C. for a time period of at least about 10 minutes; and
      (c) treating the material obtained in step (b) with a hydrogen chloride-containing gas at a temperature of about 100°–750° C. for a time period of at least about 10 minutes.

2. A method in accordance with claim 1, wherein the weight ratio of said first solid material (A) to said second solid material (B) in said composition is about 1:40 to about 10:1.

3. A method in accordance with claim 2, wherein said at least one aluminum- and chlorine-containing compound used in step (a) is aluminum chloride.

4. A method in accordance with claim 2, wherein said at least one aluminum- and chlorine-containing compound used in step (a) is selected from the group consisting of methylaluminum dichloride, methylaluminum sesquichloride, dimethylaluminum chloride, ethylaluminum dichloride, ethylaluminum sesquichloride, diethylaluminum chloride, propylaluminum dichloride, dipropylaluminum chloride, butylaluminum dichloride, dibutylaluminum chloride and mixtures thereof.

5. A method in accordance with claim 2, wherein the weight ratio of said at least one aluminum- and chlorine-containing compound to said first alumina material in step (a) is about 0.05:1 to about 1:1, wherein time period of step (b) is about 0.5–20 hours, and the time period of step (c) is about 0.2–20 hours.

6. A method in accordance with claim 5 wherein step (c) is carried out at a temperature of about 250°–650° C. for a time period of about 0.5–3 hours.

7. A method in accordance with claim 2, wherein said first solid material (A) has been prepared by a method comprising
   (1) impregnating a second alumina material with at least one compound of at least one Group VIII metal selected from the group consisting of platinum, palladium and nickel;
   (2) calcining the impregnated alumina material obtained in step (1) at a temperature of about 300°–650° C. for a time period of at least about 10 minutes; and
   (3) treating the calcined material obtained in step (2) with a reducing gas at a temperature of about 200°–550° C. for a time period of at least about 10 minutes.

8. A method in accordance with claim 7, wherein said second alumina material is impregnated in step (1) with at least one dissolved platinum compound.

9. A method in accordance with claim 8, wherein said second alumina material is also impregnated with at least one dissolved titanium compound.

10. A method in accordance with claim 7, wherein said second alumina material is impregnated in step (1) with least one palladium compound.

11. A method in accordance with claim 7, wherein said second alumina material is impregnated in step (1) with at least one nickel compound.

12. A method in accordance with claim 7, wherein the time period of step (2) is about 0.5–20 hours, the time period of step (3) is about 0.5–200° C., and said reducing gas used in step (3) comprises free hydrogen.

13. A method in accordance with step 7, wherein said second alumina material used in step (1) contains about 0.5–1.0 weight-% Ti.

14. A method in accordance with claim 1, wherein said first alumina material used in step (a) contains about 0.05–1.0 weight-% Ti.

15. A method in accordance with claim 1, wherein said composition comprising said first solid material (A) and said second material (B) contains about 0.01–50 weight-% of said at least one Group VIII metal and about 1–8 weight-% Cl.

16. A method in accordance with claim 15, wherein said composition contains about 1–45 weight-% nickel.

17. A method in accordance with claim 15, wherein said composition contains about 0.1–10 weight-% of at least one Group VIII metal selected from the group consisting of platinum and palladium.

18. A method in accordance with claim 17, wherein said composition further comprises about 0.05–1.0 weight-% titanium.

19. A composition prepared by the method of claim 1.
20. A composition prepared by the method of claim 2.
21. A composition prepared by the method of claim 3.
22. A composition prepared by the method of claim 4.
23. A composition prepared by the method of claim 7.
24. A composition prepared by the method of claim 15.
25. A composition prepared by the method of claim 16.
26. A composition prepared by the method of claim 17.

27. A composition prepared by the method of claim 18.

28. A process for isomerizing at least one saturated feed hydrocarbon containing 4–8 carbon atoms per molecule selected from the group consisting of alkanes and cycloalkanes to at least one product isomer which comprises contacting said at least one saturated feed hydrocarbon and hydrogen gas at a temperature of at least 200° C. with the catalyst composition prepared by the method of claim 1.

* * * * *